No. 862,117. PATENTED JULY 30, 1907.
J. W. SMITH.
LUBRICANT SEAL SHAFT PACKING.
APPLICATION FILED FEB. 28, 1906.
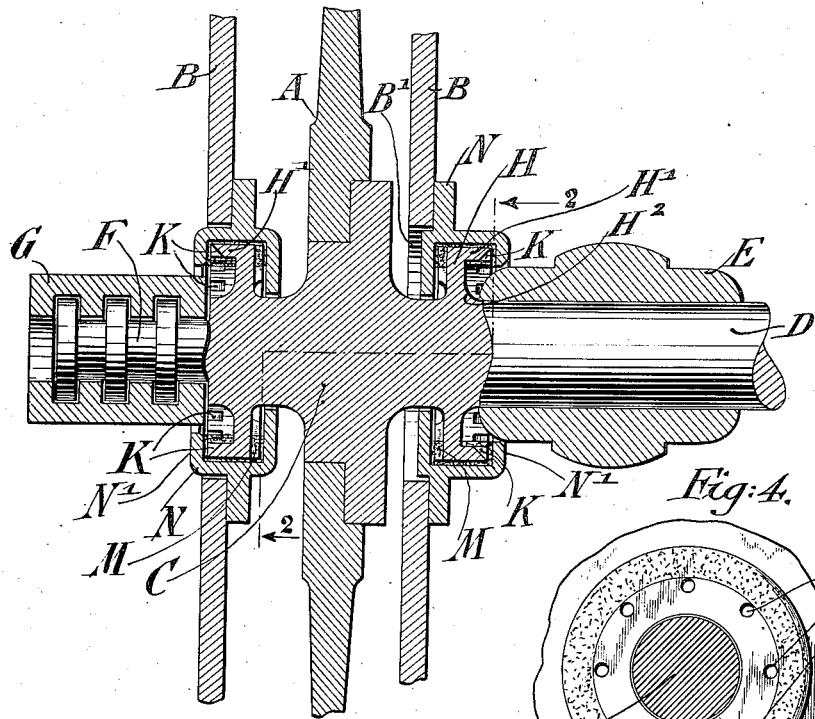
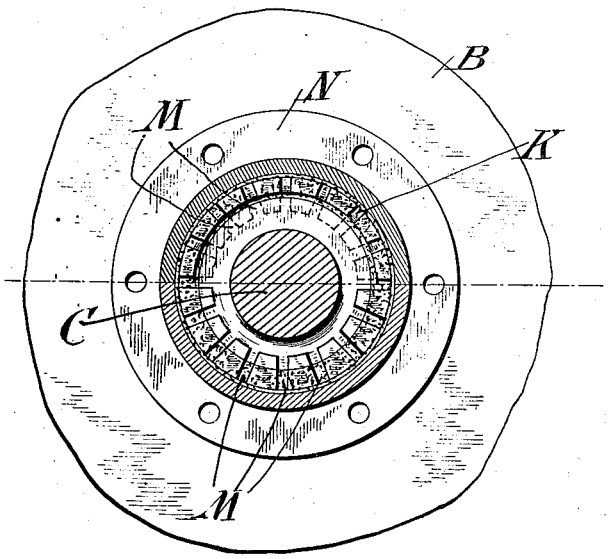
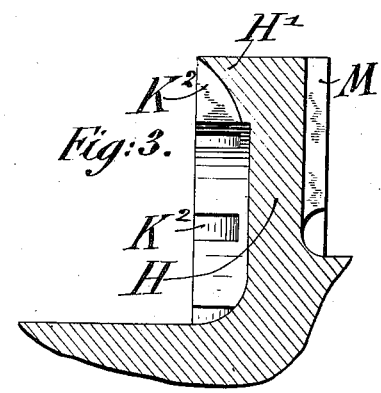
Witnesses
Edward O'Neer
Fannie Fisk
Inventor
John W. Smith
By his Attorneys

UNITED STATES PATENT OFFICE.

JOHN W. SMITH, OF ERIE, PENNSYLVANIA, ASSIGNOR TO BALL ENGINE COMPANY, OF ERIE, PENNSYLVANIA, A CORPORATION OF PENNSYLVANIA.

LUBRICANT-SEAL SHAFT-PACKING.

No. 862,117.  Specification of Letters Patent.  Patented July 30, 1907.

Application filed February 28, 1906. Serial No. 303,459.

*To all whom it may concern:*

Be it known that I, JOHN W. SMITH, a citizen of the United States, and a resident of Erie, county of Erie, and State of Pennsylvania, have invented certain new and useful Improvements in Lubricant-Seal Shaft-Packings, of which the following is a specification.

This invention relates to improvements in shaft packings, and more particularly to improvements in lubricant-seal shaft packings to be used in connection with turbines and similar motors, the parts of which rotate rapidly and which at one side of the packings are subjected to a high pressure.

The invention has for its object to provide a packing which is not influenced by the pressure to which one side of the same may be subjected.

It has further for its object to provide a liquid-packing, the position of which liquid in the packing may be predetermined and retained.

The invention has further for its object to utilize for the packing, the lubricant used for the rotating members.

For this purpose, my invention consists of a liquid-seal packing, comprising a casing, a disk or collar rotatable therein, a liquid interposed between the casing and disk or collar, and means for maintaining the interposed liquid at a predetermined position; and the invention consists further in the combination with a lubricant-seal packing, of a bearing having means for supplying the same with lubricant, and arranging these parts so as to have the packing take up the lubricant from the bearing; and the invention consists further in the special form of collar or disk of my improved shaft packing, having radial recesses at one side thereof and axial recesses at the other for causing the liquid to be forced radially outward by the centrifugal force of the rotating disk or collar.

The invention consists further of certain novel features and combinations of parts to be hereinafter described and finally pointed out in the claims.

In the accompanying drawings, Figure 1 represents a vertical transverse section of a turbine wheel secured to its axis, the ends of which are supported in bearings, between which and the turbine wheel, my improved packings are arranged. Fig. 2 represents a vertical section of the parts shown in Fig. 1, taken on line 2—2 thereof, Fig. 3 shows a detail view on an enlarged scale, of a somewhat modified form of the disk or collar forming part of my improved packing, and Fig. 4 shows a modified form of casing.

Similar letters of reference indicate corresponding parts.

Referring to the drawings, A represents a turbine wheel rotatable within the casing B, and secured to the shaft C, one end of which is rotatable in a journal bearing E, while the end F of the shaft C is rotatable in a thrust bearing G.

Intermediate between the turbine wheel A and the bearing E, the shaft C is provided with a collar or disk H. Surrounding this collar and secured to the walls of the casing B, is a small casing or chamber N.

The collar H has a flange $H^1$, the end of which is provided with a plurality of axially arranged inclined recesses K, as shown clearly in Fig. 1. At the same side of these recesses, the collar or disk H is rounded or curved as shown by $H^2$, the object of which is to cause the liquid supplied, to be guided radially along the collar and toward the periphery thereof. So, the object of the inclined recesses K is to cause the liquid to be forced outward of the collar and against the casing on the rapid rotation of the collar. The other side of the collar H is provided with a plurality of radially arranged recesses M, the object of which is to cause the liquid to be forced out radially toward the periphery of the rapidly rotating collar, by the centrifugal force. By the arrangement of the recesses K and M, the liquid forming the seal is caused to rotate at practically the same speed as the collar.

In order to utilize the lubricant of the bearings F and G, as a liquid seal after it has performed its lubricating function, the bearings and the packing are arranged in close proximity, so that the lubricant, after leaving the bearings, flows towards the collar H, and on the curved portion $H^2$ thereof and is forced by centrifugal force radially outwards and against the casing. During the rotation of the collar both sides of the liquid-seal are of the same height, and the two columns of oil would balance each other. If however, the turbine case should have a vacuum, then the equilibrium of the two columns would be impaired, and the oil would be drawn inside of the casing as fast as the bearing overflowed. To prevent this, the side of the casing N extends at the side adjacent the turbine wheel down as far as the shaft of the same, while the side off from the turbine wheel and adjacent to the bearing does not extend down to the shaft, but solely part of the way. The shortened side wall $N^1$ of the casing is limited for the purpose of causing the lubricant to be maintained at a position depending on the length measured in a radial direction of that depending side of the casing. Thus the difference in the two columns of oil forming the packing is so regulated that the vacuum in the turbine wheel is not strong enough to carry through the column of oil on the side next to the turbine wheel long enough to cause it to overflow into the turbine case. Thus by the arrangement of the parts as shown, when a constant supply of lubricant is admitted, the lubricant forming the packing, will always overflow at the side off from the turbine wheel and on to the bearing, the amount of lubricant used as a packing being regulated by the height of the depending side $N^1$ of the casing N. It is immaterial what amount of lubricant is supplied to the collar as the size of the depending side $N^1$, of the casing will control the amount used as the packing and interposed between the collar and casing.

In the modified form shown in Fig. 3, the end of the flange $H^1$ instead of having an inclined surface has a curved surface as shown by $K^2$ in Fig. 3.

Instead of having one side of the casing shorter than the other as described and shown, both sides of the casing may be of substantially the same length, and one of the sides, namely the side off from the turbine wheel provided with holes $m$ as shown in Fig. 4, whereby an overflow feature is provided on that side.

The packing described is also suitable for sealing the joint should a back pressure exist in the turbine casing, as a column of oil could be kept under centrifugal force with sufficient force to resist the pressure in the turbine casing.

Having thus described my invention, I claim as new and desire to secure by Letters Patent:

1. A liquid-seal shaft-packing, comprising a casing, a collar therein, means for continually supplying a liquid between the casing and collar for forming a seal when either casing or collar is rotated, and means for regulating the position of the liquid interposed.

2. A liquid-seal shaft-packing, comprising a casing, a rotatable collar therein, having a flange with recesses at its end, means for continually supplying a liquid between the casing and flanged collar, and means for regulating the position of the liquid interposed.

3. A liquid-seal shaft-packing, comprising a casing, a rotatable collar therein, having a flange at one side with axially arranged inclined recesses at its end, and a plurality of recesses on the side of the collar opposite to the flanged side, and a liquid interposed between the casing and flanged collar.

4. A liquid-seal shaft-packing, comprising a casing, a rotatable collar therein, having a flange at one side with axially arranged inclined recesses at its end, and having a curved portion near its central part, and a plurality of recesses on the side of the collar opposite to the flanged side, and a liquid interposed between the casing and flanged collar.

5. In combination, with a liquid-seal shaft-packing, comprising a casing, a collar rotatable in the casing, a liquid interposed between the casing and collar, and means for regulating the position of the liquid interposed, of a bearing in proximity to the shaft-packing, adapted to discharge its lubricant in the direction of the shaft.

6. In combination, with a liquid-seal shaft-packing, comprising a casing, a collar rotatable in the casing, having radial recesses at one side and a flange with axially arranged recesses at the other side, a liquid interposed between the casing and collar, and means regulating the position of the liquid interposed, of a bearing in proximity to the shaft-packing.

7. In combination with a shaft and a liquid seal shaft-packing, of a bearing for the shaft in proximity to the shaft-packing, adapted to discharge its lubricant in the direction of the shaft-packing.

8. A collar for a liquid-seal packing, having at one side a flange with radially arranged inclined recesses, and at the other side thereof radially arranged recesses.

9. A collar for a liquid-seal packing, having at one side and at its periphery, a flange with radially arranged inclined recesses, and a curved portion near its central part, and at the other side thereof radially arranged recesses.

10. A casing for a liquid-seal shaft-packing complete in itself, provided with means forming an inherent part thereof, to regulate the position of a continually supplied liquid in the packing.

11. A collar for a liquid seal shaft packing rotatable with a shaft, having a curved portion tangential to the shaft for the flow of liquid from the shaft to the collar.

12. A collar for a liquid-seal shaft-packing, having a flange with radial recesses inclined in respect to the axis of the collar.

13. A collar for a liquid-seal shaft-packing, with radial recesses at one side, and at the other side, a flange with axially inclined recesses.

In testimony, that I claim the foregoing as my invention, I have signed my name in presence of two subscribing witnesses.

JOHN W. SMITH.

Witnesses:
  JAMES W. ALLISON,
  ROBERT L. ROBERTS.